US012603893B2

(12) United States Patent　　　　(10) Patent No.:　US 12,603,893 B2

Parvataneni et al.　　　　　　　　　(45) Date of Patent:　Apr. 14, 2026

(54) METHOD AND SYSTEM FOR DYNAMIC USER APPLICATION CONTROL SERVICE

(71) Applicant: Verizon Patent and Licensing Inc., Basking Ridge, NJ (US)

(72) Inventors: Raghuram Parvataneni, Frisco, TX (US); Parry Cornell Booker, Sunnyvale, TX (US); Anil K. Guntupalli, Irving, TX (US); Mahesh Chapalamadugu, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 91 days.

(21) Appl. No.: 18/430,092

(22) Filed: Feb. 1, 2024

(65) Prior Publication Data

US 2025/0254178 A1　　Aug. 7, 2025

(51) Int. Cl.
| | |
|---|---|
| *H04L 9/40* | (2022.01) |
| *H04W 4/02* | (2018.01) |
| *H04W 4/60* | (2018.01) |

(52) U.S. Cl.
CPC .......... *H04L 63/108* (2013.01); *H04L 63/107* (2013.01); *H04W 4/02* (2013.01); *H04W 4/60* (2018.02)

(58) Field of Classification Search
CPC ............................. H04L 63/107; H04L 63/108
See application file for complete search history.

(56) References Cited

U.S. PATENT DOCUMENTS

| | | | | |
|---|---|---|---|---|
| 8,831,562 B2 * | 9/2014 | Bhatia | ................. | H04L 12/1485 |
| | | | | 455/406 |
| 2012/0023556 A1 * | 1/2012 | Schultz | .................. | G06F 21/41 |
| | | | | 726/8 |
| 2012/0054841 A1 * | 3/2012 | Schultz | .................. | G06F 21/51 |
| | | | | 726/22 |
| 2013/0337769 A1 * | 12/2013 | Bhatia | .................. | H04M 15/81 |
| | | | | 455/406 |
| 2015/0382197 A1 * | 12/2015 | Ren | ....................... | H04W 12/02 |
| | | | | 726/3 |
| 2017/0013016 A1 * | 1/2017 | Wong | ...................... | H04L 63/10 |
| 2020/0204565 A1 * | 6/2020 | Zhong | .................. | H04W 4/023 |
| 2022/0286307 A1 * | 9/2022 | Thompson | ........ | H04M 15/8016 |

FOREIGN PATENT DOCUMENTS

| | | | | |
|---|---|---|---|---|
| EP | 2940927 A1 * | 11/2015 | ........ | H04M 15/8038 |

* cited by examiner

*Primary Examiner* — Jonathan A Bui

(57) ABSTRACT

A method, network device, system, and non-transitory computer-readable storage medium are described in relation to an dynamic user application control service that includes receiving from an application device, a request for access controls associated with a user application and an end device; generating, per the request, policies pertaining to the access controls, wherein the policies include time-based rules, location-based rules, or application type-based rules; obtaining a current location of the end device; comparing, by the network device, a current time with the time-based rules, the current location with the location-based rules, or an application type for the user application with the application-type rules; generating, per the comparing, a policy decision among the policies pertaining to the access controls; and applying, per the policy decision, the time-based rules, the location-based rules, and the application type-based rules for establishment of an application session with the end device.

20 Claims, 5 Drawing Sheets

500

200

280

USER DATA STORAGE (UDS) 210

POLICY STORAGE (PS) 220

LOCATION STORAGE (LS) 230

USER LOCATION ENGINE (ULE) 240

POLICY ENGINE (PE) 250

NEF ADAPTER (NA) 260

PCF ADAPTER (PA) 270

500

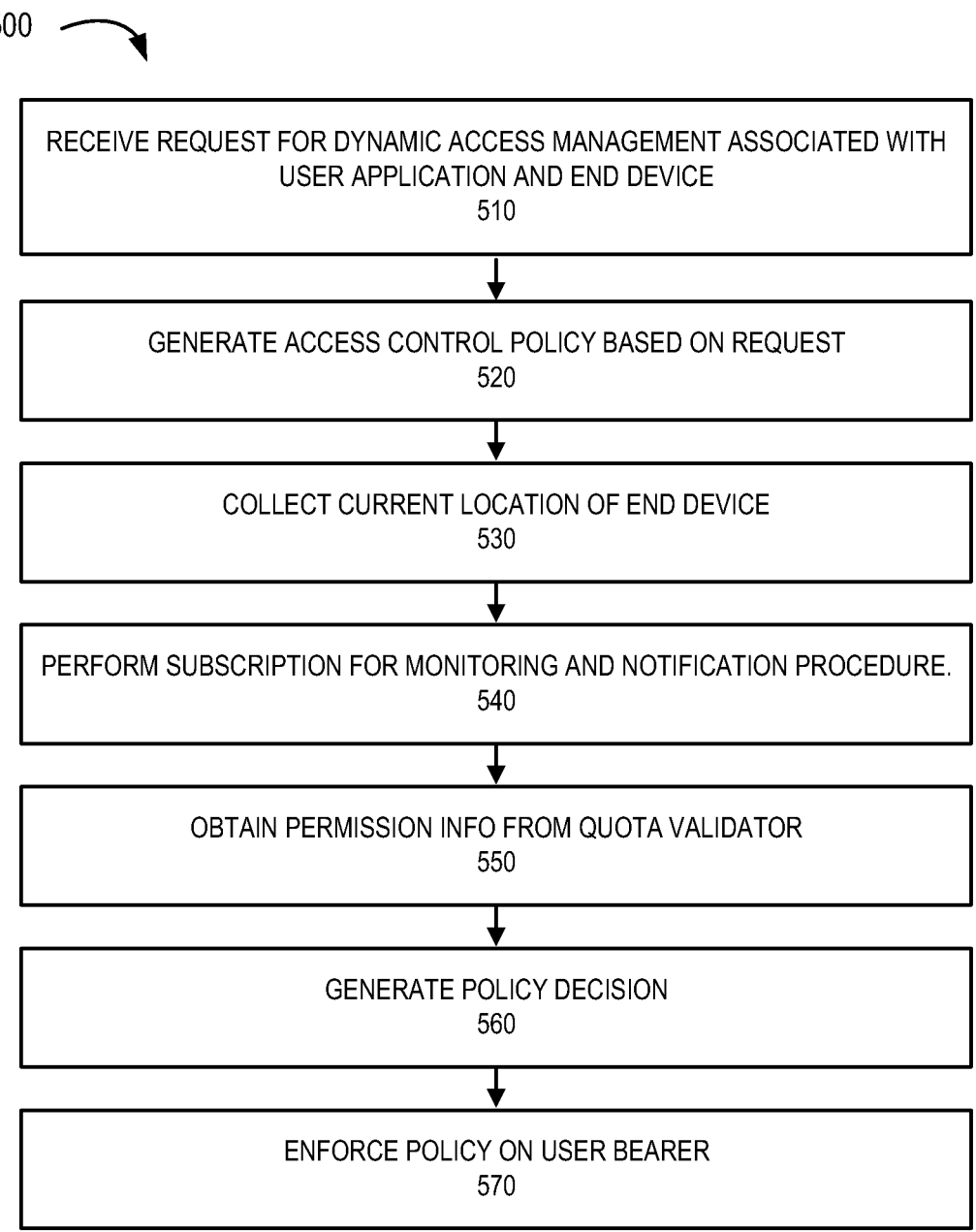

RECEIVE REQUEST FOR DYNAMIC ACCESS MANAGEMENT ASSOCIATED WITH
USER APPLICATION AND END DEVICE
510

↓

GENERATE ACCESS CONTROL POLICY BASED ON REQUEST
520

↓

COLLECT CURRENT LOCATION OF END DEVICE
530

↓

PERFORM SUBSCRIPTION FOR MONITORING AND NOTIFICATION PROCEDURE.
540

↓

OBTAIN PERMISSION INFO FROM QUOTA VALIDATOR
550

↓

GENERATE POLICY DECISION
560

↓

ENFORCE POLICY ON USER BEARER
570

Fig. 5

METHOD AND SYSTEM FOR DYNAMIC USER APPLICATION CONTROL SERVICE

BACKGROUND

Development and design of networks present certain challenges from a network-side perspective and an end device perspective. For example, Next Generation (NG) wireless networks, such as Fifth Generation New Radio (5G NR) networks are being deployed and are under development. End devices may connect to a radio access network (RAN) according to various types of configurations and may be afforded different quality of service (QOS) levels.

BRIEF DESCRIPTION OF THE DRAWINGS

FIG. 5 is a diagram illustrating an exemplary process of an exemplary embodiment of the dynamic user application control service.

DETAILED DESCRIPTION

The following detailed description refers to the accompanying drawings. The same reference numbers in different drawings may identify the same or similar elements. Also, the following detailed description does not limit the invention.

Network operators may offer unlimited and/or quota-limited user plans for providing network services to end devices. Under such service plans, users and/or enterprise subscribers may only have limited administrative control of application-related access. For example, parental control applications may be available which operate at the domain name system (DNS) level and application level. However, such controls may be susceptible to being bypassed. Thus, user experience would be enhanced from network-level enforcement of application service access through implementation of policy-based access control.

According to exemplary embodiments, a dynamic user application control service is described herein. The dynamic user application control service may be applied to a wireless environment. For example, the wireless environment may include a Fourth Generation (4G) wireless environment, a wireless local area network (WLAN), a 5G wireless environment, an evolved packet system (EPS)-5G core (5GC) interworking network, a 4G core network, a 5GC network, and/or a future generation wireless environment, as described herein.

According to various exemplary embodiments, the dynamic user application control service may be implemented to include a network device. For purposes of description, the network device may include a dynamic user application access control function, as described herein. The network device may include functional elements that provide various sub-services of the dynamic user application control service, as described herein.

According to an exemplary embodiment, the dynamic user application control service may provide policy-based dynamic roaming and application access services using network and policy-based application programming interfaces (APIs). The dynamic user application control service may enable a subscriber, or a third-party application function, to specify application service access requirements that relate to various types of end device criteria, as described herein. The dynamic user application control service may define, select, enforce, and/or update policies based on user-specific information, location- and time-based application policies, and/or geographic areas of interest. For example, network and policy-based APIs may specify criteria for user access of application services and policy enforcement via the radio frequency (RF) bearer.

In view of the foregoing, the dynamic user application control service may enable application access control without using client- or enterprise-side application event monitoring and notification services.

Figure 1:
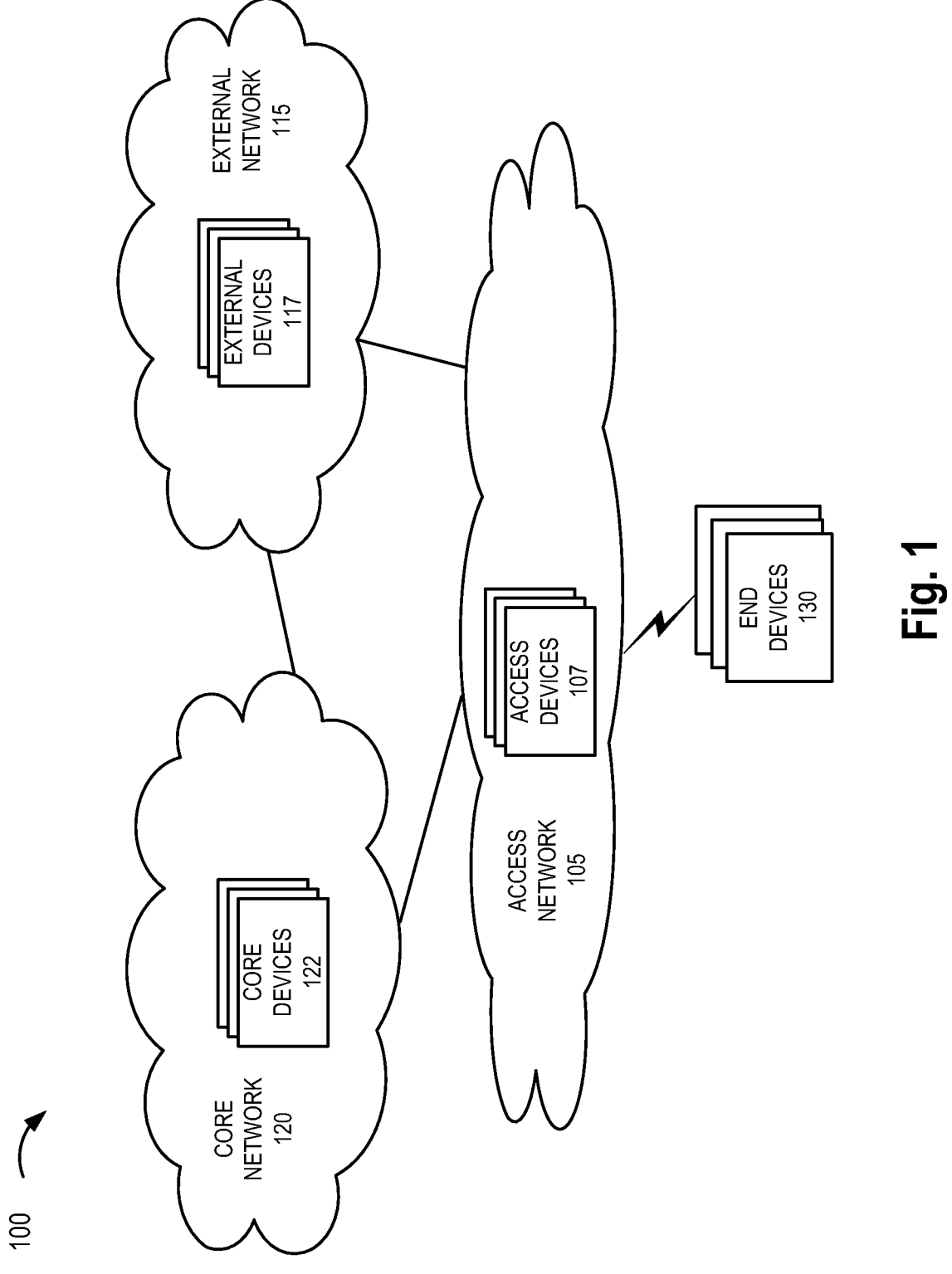
FIG. 1 is a diagram illustrating an exemplary environment in which an exemplary embodiment of a dynamic user application control service may be implemented.

FIG. 1 is a diagram illustrating an exemplary environment 100 in which an exemplary embodiment of a dynamic user application control service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually and generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the dynamic user application control service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), Global System for Mobile Communications Association (GSMA), etc.) or a new interface of the network device may be provided in order to support the communication (e.g., transmission and reception of messages, information elements (IEs), attribute value pairs (AVPs), etc.) between network devices and the dynamic user application control service logic of the network device, as described herein. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. According to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced Long Term Evolution (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), Data-as-a-Service (DaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application service may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the dynamic user application control service. For example, an AS, a MEC server, an IP server, a cloud server, an Internet or Web server, a similar network device that may host an application service (also referred to simply as an AS), or another type of external device 117 (e.g., a management device associated with a farm or cluster of ASs, etc.) may provide an exemplary embodiment of the dynamic user application control service, as described herein.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM), a unified data repository (UDR), an authentication server function (AUSF), a security anchor function (SEAF), a network exposure function (NEF), a network slice selection function (NSSF), a network repository function (NRF), a policy control function (PCF), a network data analytics function (NWDAF), a service capability exposure function (SCEF), a lifecycle management (LCM) device, a mobility management entity (MME), a PDN gateway (PGW), an enhanced packet data gateway (ePDG), a serving gateway (SGW), a home agent (HA), a General Packet Radio Service (GPRS) support node (GGSN), an HSS, an authentication, authorization, and accounting (AAA) server, a policy and charging rules function (PCRF), a policy and charging enforcement function (PCEF), and/or a charging function (CHF).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the dynamic user application control service. For example, one or multiple AFs may provide an exemplary embodiment of the dynamic user application control service, as described herein. The AF(s) may include functional elements that provide sub-services of the dynamic user application control service. For example, the AF(s) may include a storage device that may store end device profile information, a policy device that may store and create policies relating to an application and end device 130, as described herein. The AF(s) may include a controller or management device that may dynamically generate communication profiles for obtaining information from other network devices and systems of relevance to the policies associated with the user application and end device 130. The AF(s) may also include a collection and notification device(s) that may subscribe to notifications pertaining to end device location-triggered updates and other policy-related states associated with the application and end device 130, as well as providing such notifications to the subscribing device. For example, the subscribing device may be implemented as an AS or the like, which may host the user application of relevance to which end device 130 may use or access. The AF(s) is described further herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

Figure 2:
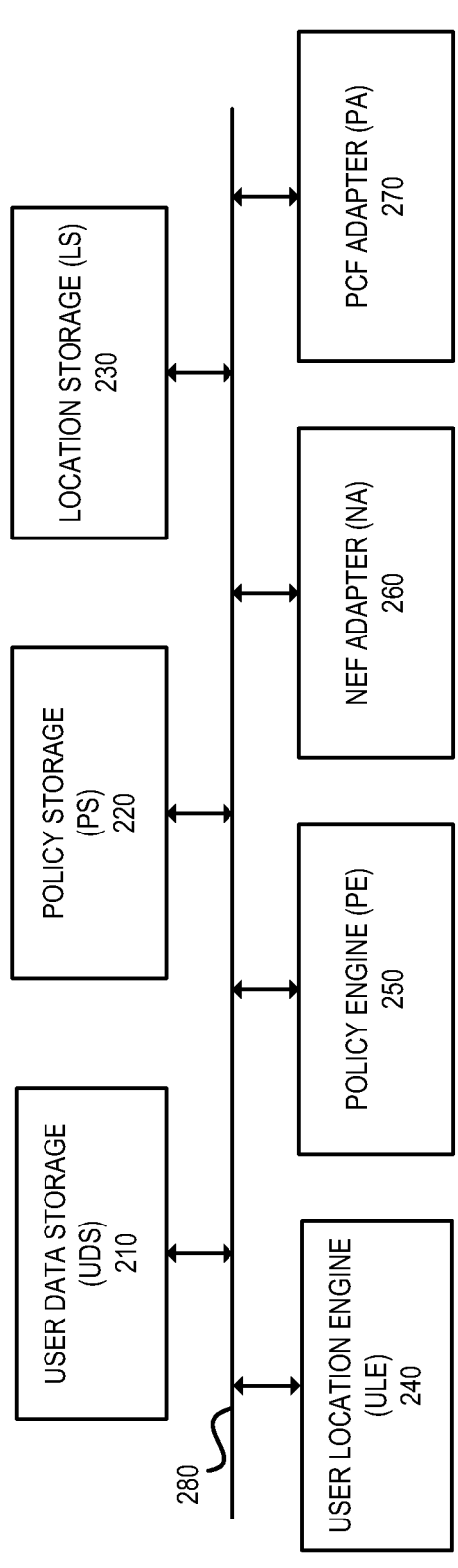
FIG. 2 is a diagram illustrating exemplary components of a network device that provide an exemplary embodiment of the dynamic user application control service.

FIG. 2 is a diagram of exemplary components of a network device 200 that may provide an exemplary embodiment of the dynamic user application control service. As illustrated, network device 200 may include a user data storage (UDS) 210, a policy storage (PS) 220, a location storage (LS) 230, a user location engine (ULE) 240, a policy engine (PE) 250, a NEF adapter (NA) 260, a PCF adapter (PA) 270, and a communication link 280. The number, type, and arrangement of components and links are exemplary.

Communication link 280 may include a hardware link (e.g., a bus, a shared memory space, etc.), a software link (e.g., inter-process communication (IPC) or the like), an API, or some other type of communicative link (e.g., a wired connection, an optical connection, a wireless connection, etc.). Communication link 280 may enable communication between one or multiple other components of network device 200, using any suitable protocol.

User data storage 210 may include a repository or storage device that collects and/or stores end device profile information and/or user application profile information. For example, the end device profile information may include one or multiple identifiers pertaining to end devices 130. For example, the identifier may be implemented to include International Mobile Subscriber Identities (IMSIs), Subscription Permanent Identifiers (SUPIs), International Mobile Equipment Identities (IMEIs), Mobile Directory Numbers (MDNs), Permanent Equipment Identifiers (PEIs), and/or the like. The end device profile information may include other identifiers, such as card identifiers (e.g., Integrated Circuit Card Identifiers (ICCIDs), subscriber identification module (SIM) card identifiers, eSIM identifiers, etc.), network access identifiers (NAIs), Mobile Equipment Identifiers (MEIDs), Media Access Control (MAC)

addresses, Internet Protocol (IP) addresses, and/or another type of string that may (uniquely) identify end device 130, a component of end device 130 (e.g., a circuit board, a card, or other form of hardware and/or software), and/or a user associated with end device 130.

The end device profile information may include other information pertaining to attributes or characteristics of end device 130, such as the make and model of end device 130, type and/or form factor of end device 130 (e.g., mobile phone, tablet, camera, video camera, sensor, IoT, operated by a user, not operated by a user, etc.), operating system (OS) and version, wireless capabilities (e.g., network frequencies and/or frequency bands supported), and/or radio access technologies (RATs) supported (e.g., 4G, 5G, 4G+5G, 6G, etc.).

The user application profile information may include an identifier of a user application. For example, the identifier may be a unique string (e.g., numerical, alphanumeric, etc.) that identifies the user application. The user application profile information may include other attribute and/or characteristics information pertaining to the user application. For example, the attribute information may indicate a category of the user application (e.g., real-time, extreme real-time, ultra-reliability, video streaming, industrial, medical, etc.) and/or minimum requirements pertaining to quality of service (QOS) and/or other performance metrics (e.g., key performance indicator (KPI), quality of experience (QoE), mean opinion score (MOS), or the like), which may relate to bandwidth, packet error rate, latency, throughput, bit rate (e.g., guaranteed, minimum, maximum, aggregate, etc.), round trip time, a 5G QoS Identifier (5QI) value, data burst volume, application availability, and/or the like.

According to an exemplary embodiment, user data storage 210 may store the end device profile information of end device 130 and the user application profile information of the user application such that the information is correlated or mapped to one another. User data storage 210 may further include a device that includes logic of the dynamic user application control service, as described herein.

Policy storage 220 may include a repository or storage device that collects and/or stores policy information or rules defining access requirements associated with a user application of an application device (e.g., AS, MEC server, Web server, cloud server, etc.) that may use or subscribe to the dynamic user application control service. As an example, a policy may define a rule that may be enforced with respect to user location, time of day, or other user application access control parameters.

Location storage 230 may include a repository or storage device that collects and/or stores physical location information relative to access of an application service. The location information may map areas of interest for a usage of a particular application service. For example, the location information may include a tracking area code (TAC), an RF cell identifier, a geofence identifier, geographic coordinates, GPS data, geopolitical information, or any other location information.

User location engine 240 may include a device that provides a location service of the dynamic user application control service. User location engine 240 may make one or multiple decisions based on a comparison of the areas of interest collected by and/or stored in location storage 230 to a current location of end device 130 for a PDU session. For example, user location engine 240 may obtain current location information as constantly monitored by a NEF (e.g., triggered by an update to device status), as described further below.

Policy engine 250 may include a device that provides a policy service of the dynamic user application control service. Policy engine 250 may dynamically create one or multiple policies based on one or multiple access rules (e.g., time-based, location-based, application type, etc.) associated with a user application of an application device (e.g., AS, MEC server, Web server, cloud server, etc.) that may request or subscribe to the dynamic user application control service. For example, policy engine 250 may evaluate and apply the access controls to a user profile obtained from user data storage 210, policy information associated with a requested user application and obtained from policy storage 220, and a location decision obtained from user location engine 240. Policy engine 250 may determine an access control action to be activated when a triggering event (e.g., a change in location, a change with respect to time, etc.) occurs, and enforce that control action via a radio bearer during the PDU session.

As an example, assume an enterprise subscriber has requested a service for dynamic management of user application controls for a set of subscriber end devices 130. Policy engine 250 may define policies for user application access. For example, policy engine 250 may generate policies for different ones of end devices 130 based on information provided by the enterprise via an API, for example, such as user information particular to each end device 130, location-based and/or time-based access controls, and the type of application service for which access may be controlled. Policy engine 250 may dynamically generate policy decisions based on the applicable policies. Additionally, policy engine 250 may generate information relating to enforcement of the policy decisions for at least a portion of a PDU session.

According to some exemplary embodiments, policy engine 250 may register with the other network devices that may monitor and notify policy engine 250 for other types of events. As an example, the events may relate to when end device 130 attaches to access network 105, attaches and/or registers with core network 120, when end device 130 detaches, de-registers, and/or is in a particular network state (e.g., idle, sleep, active, roaming, non-roaming, etc.), when end device 130 may transition from being in a permitted access state to an unpermitted access state, and/or other configurable events that may relate to the network-side monitored policies, as described herein.

NEF adapter 260 may include a device that provides an interface service that may include signaling translation services, as described herein, of the dynamic user application control service. For example, NEF adapter 260 receives data indicative of the criteria associated with the policy decisions and/or the location decisions, the application access and/or usage requirements, end devices 130, and the user application. NEF adapter 260 may interface with other network devices when requested information associated with the policy is available, as described herein. As an example, NEF adapter 260 may interface with a NEF and/or another type of network device, such as access device 107, external device 117, and/or core device 122, as described herein. NEF adapter 260 may be implemented as a distributive system that may reside in access network 105, external network 115, and core network 120. NEF adapter 260 may, according to a location subscription, report location update notifications and/or other types of events, as described herein, to user location engine 240 and/or policy engine 250. For example, the location update procedure may include the creation of a subscription with the network device (e.g., access device 107, external device 117, core device 122, X-haul device, etc.) for obtaining notifications when a location event occurs.

PCF adapter 270 may include a device that provides an interface service that may include signaling translation services, as described herein, of the dynamic user application control service. For example, PCF adapter 270 receives data indicative of the criteria associated with the policy decisions and/or the location decisions, the application access and/or usage controls, end devices 130, and the user application. PCF adapter 270 may interface with other network devices when requested information associated with the policy is available, as described herein. As an example, PCF adapter 270 may interface with a PCF and/or another type of network device, such as access device 107, external device 117, and/or core device 122, as described herein. PCF adapter 270 may be implemented as a distributive system that may reside in access network 105, external network 115, and core network 120. PCF adapter 270 may report policy notifications and/or other types of events, as described herein, to user location engine 240 and/or policy engine 250.

FIG. 2 illustrates exemplary components that may provide an exemplary embodiment of the dynamic user application control service, however according to other exemplary embodiments, additional, fewer, and/or different components may be implemented. For example, a single component/device may be implemented as multiple components/devices and/or multiple components/devices may be implemented as a single component/device.

Figure 3:
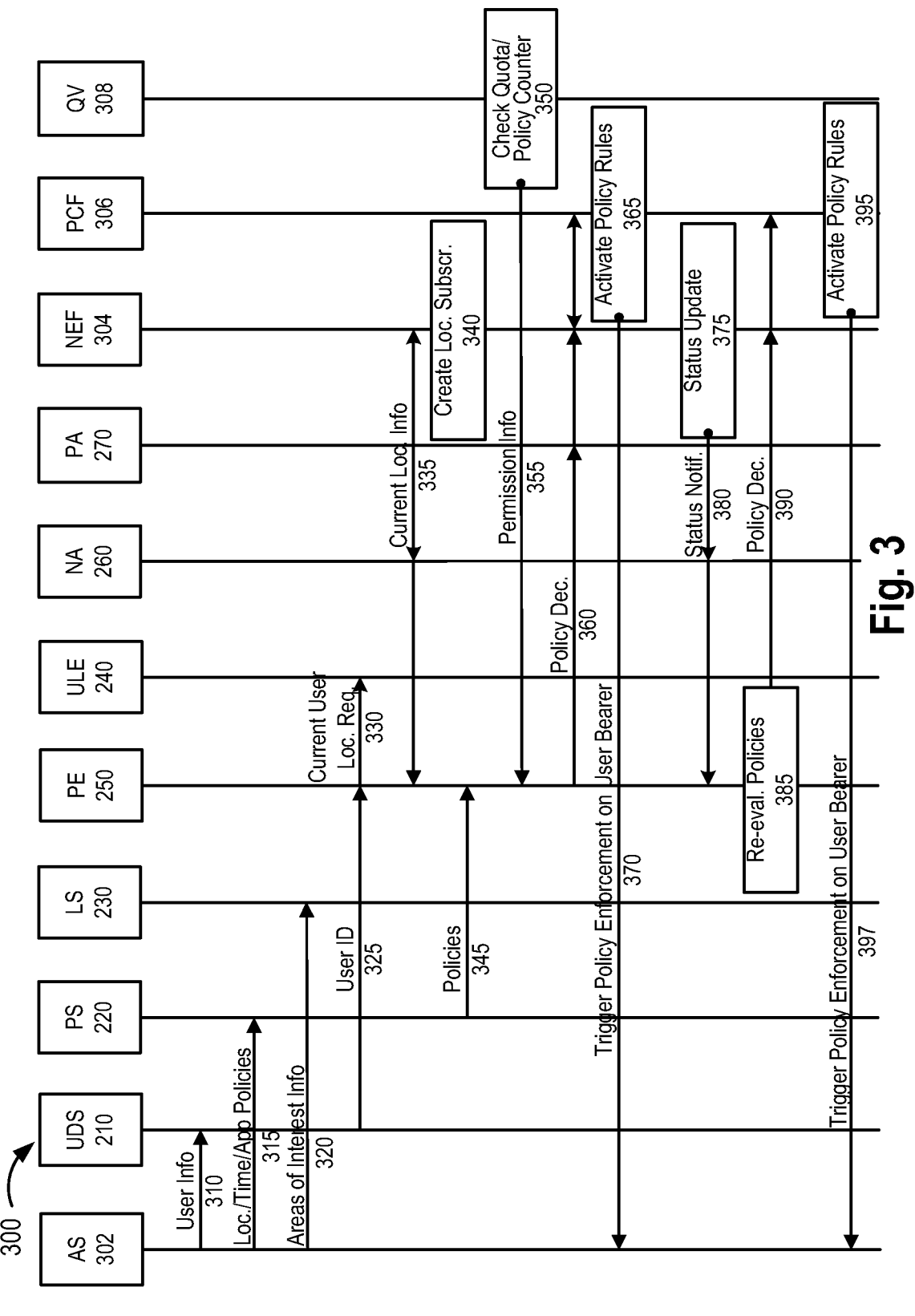
FIG. 3 is a diagram illustrating an exemplary communication flow of an exemplary embodiment of the dynamic user application control service according to an exemplary scenario.

FIG. 3 is a diagram illustrating an exemplary communication flow or process 300 of an exemplary embodiment of the dynamic user application control service according to an exemplary scenario. As illustrated, an exemplary environment may include an application server (AS) 302, user data storage (UDS) 210, policy storage (PS) 220, location storage (LS) 230, policy engine (PE) 250, user location engine (ULE) 240, NEF adapter (NA) 260, PCF adapter (PA) 270, a NEF 304, a PCF 306, and a quota validator (QV) 308. Application server 302 is an exemplary implementation of external device 117. User data storage 210, policy storage 220, location storage 230, policy engine 250, user location engine 240, NEF adapter 260, PCF adapter 270, NEF 304, PCF 306, and quota validator 308 are exemplary implementations of core devices 122. As previously described, one or more of the devices may be implemented as an application function that may reside in core network 120, and process 300 may include other core network devices, such as a CHF, for example, that interfaces with quota validator 308.

Application server 302 may host an application service that may be controllably accessed by end device 130. For example, the application service may be an application service described in relation to external device 117. According to various exemplary embodiments, application server 302 may be associated with a network operator or similar entity associated with access network 105, core network 120, and/or external network 115, or may be associated with a third party relative to the network operator or similar entity.

According to an exemplary embodiment, prior to the execution of process 300, application server 302 may respond to an exposed API with a request for a user application control service, by providing the end device profile information from the users of end devices 130 or end devices 130 of relevance. According to another exemplary embodiment, a network operator, a service provider, and/or another type of third-party entity (e.g., associated with access network 105, core network 120, etc.) may obtain the end device profile information relating to the users of end devices 130 or end devices 130 on behalf of an entity associated with AS 302.

Referring to FIG. 3, application server 302 may generate and transmit a message 310 that includes user and/or end device information to user data storage 205. For example, the end device information may include an identifier of end device 130, as described herein. Message 310 may include application data. For example, the application data may include an identifier of a type of application that application server 302 may be hosting and that end device 130 may controllably access and use. Message 310 may be sent to user data storage 210. Application server 302 may generate and transmit a message 315 that includes application access control policies. For example, application access control policies may be location-based and/or time-based parameters, as described herein. Message 315 may be sent to policy storage 220. Application server 302 may generate and transmit a message 320 that includes areas of interest information that is mapped to one or multiple locations identified, for example, in message 315, as described herein. Message 325 may be sent to policy engine 250.

According to various exemplary embodiments, the application access control policies may relate to a pre-configured application policy and/or a customized application policy. According to some exemplary embodiments, message 320 may include data regarding the requested access control. For example, the action data may indicate restricted access to a particular type of user application based on a current location, a current time of day and/or day of the week, and/or resource usage parameters. In process 300, user data storage 210 may send a message 325 that identifies the user and/or end device 130, to policy engine 250.

In response to receiving, reading, and analyzing message 325, policy engine 250 may send a message 330 requesting current location information from user location engine 240. In response to message 330, policy engine 250 may request and receive, via NEF adapter 260, current location information 335 from NEF 304 for end device 130. NEF 304 may perform a subscription for monitoring and notification procedure. In some embodiments, NEF 304 may create a location subscription 340 that continually monitors end device 130's location, and transmits notifications of changes to end device 130's location when the change corresponds to a threshold for notification. Policy engine 250 may receive a message 345 including policy information, as described herein, from policy storage 220.

Process 300 further includes quota validator 308 performing a procedure 350 for obtaining credit information for each policy rule to be activated. For example, quota validator 308 may request and receive credit information with respect to data usage from another core device 122 of core network 120, such as a CHF or the like. Quota validator 308 may send a message 355 that includes permission information to policy engine 250.

Policy engine 250 may perform a procedure to generate one or multiple policies in a policy decision 360 pertaining to the access controls for the corresponding application(s) associated with end devices 130, as described herein. For example, policy engine 250 may evaluate the user information, the policy information, the areas of interest information, the current location information and/or the permission information application, identify underlying criteria of or indicative of the user application access controls in relation to networks devices of a network (e.g., access network 105, access devices 107, core network 120, core devices 122, etc.), end device 130, network information (e.g., roaming, data usage, location, etc.), and the like. Policy engine 250 may send to NEF 304 (e.g., via NEF adapter 260) and/or PCF 306 (via PCF adapter 270) the policies, and correlate the policies with other information, such as user application access controls and other relevant information (e.g., end device identifiers, etc.).

PCF 306 may perform a procedure 365 to activate policy rules based on policy decisions 360, and send a message 370 to application server 302 to trigger policy enforcement on a user bearer associated with the PDU session.

Based on the subscription or registration with a network device associated with the location notification service, NEF 304 may trigger a status update 375. Status update 370 may relate to a triggering event (e.g., a change in a location of relative to areas of interest or a spending limit breach, as described herein) or a non-event (e.g., pertaining to periodic monitoring) and end device 130. In response, NEF 304 may generate and transmit a status notification 380, which may include information of status update 375, to policy engine 250. In response to receiving status notification 380, policy engine 250 may re-evaluate policies 385. For example, policy engine 225 may evaluate the current user location included in status notification 375, and make a policy decision 390 corresponding to areas of interest parameters pertaining to the user application access controls. According to this example, policy engine 250 may send a notification to PCF 306. In response to policy decision 390, PCF 306 may activate policy rules 395 that trigger policy enforcement on the particular user bearer 397 at AS 302.

FIG. 3 illustrates an exemplary communication flow or process 300 of the dynamic user application control service, however, according to other exemplary embodiments, the dynamic user application control service may perform additional operations, fewer operations, and/or different operations than those illustrated and described in relation to FIG. 3. For example, additional messages may be generated and transmitted to execute a step of process 300, which may have been omitted for the sake of brevity.

Figure 4:
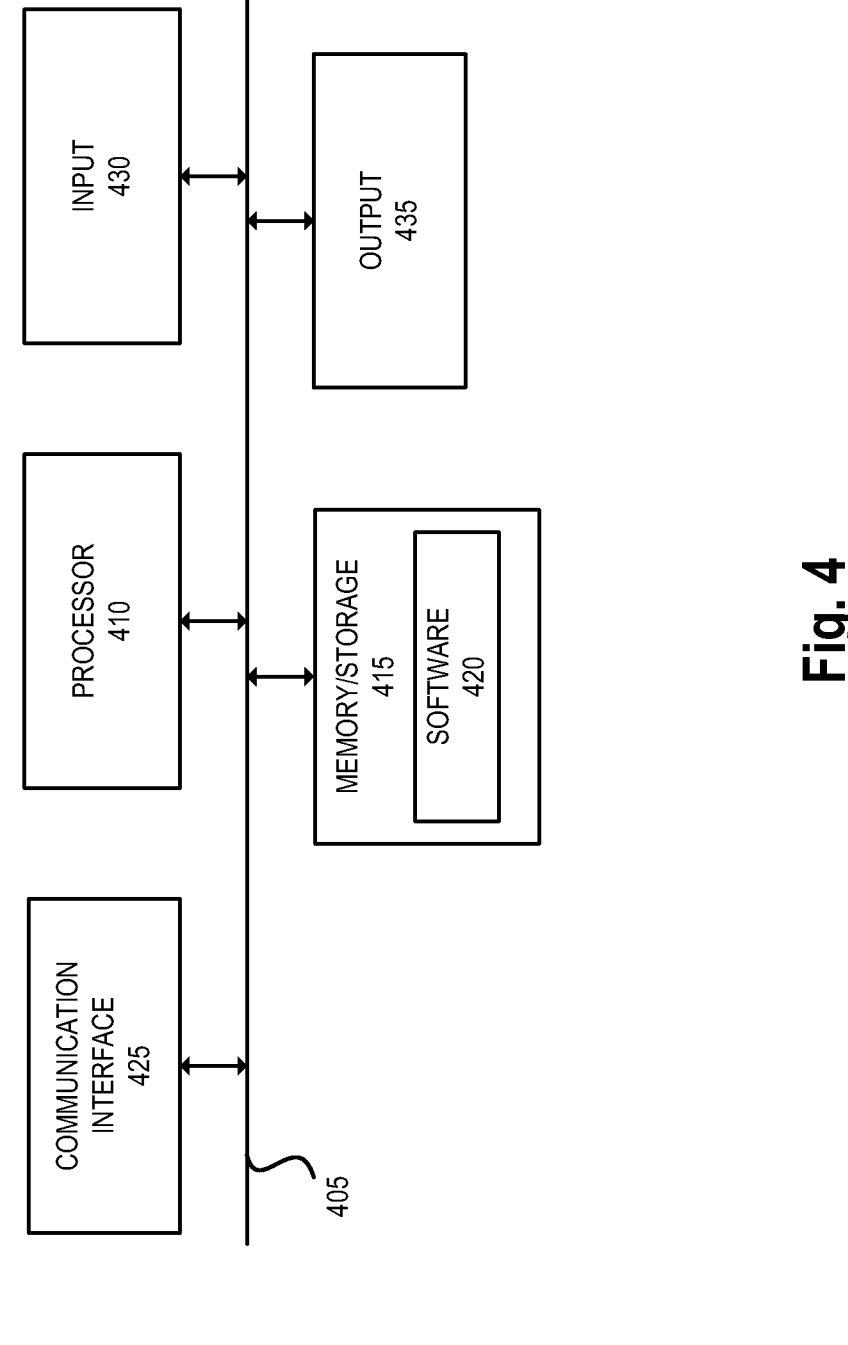
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, end device 130, network device 200, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to core device 122 (e.g., network device 200, etc.), software 420 may include an application that, when executed by processor 410, provides a function and/or a process of the dynamic user application control service, as described herein. Software 420 may also include firmware, middleware, microcode, hardware description language (HDL), and/or another form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, SaaS, DaaS, etc.). Device 400 may be implemented in the same manner. For example, device 400 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 400 may be configured to perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function, an operation, or a process described herein. Alternatively, for example, according to other implementations, device 400 may be configured to perform a function, an operation, or a process described herein based on the execution of hardware (processor 410, etc.).

FIG. 5 is a flow diagram illustrating an exemplary process 500 of an exemplary embodiment of the dynamic user application control service. According to an exemplary embodiment, core device 122, such as network device 200 may perform operations of process 500. For example, network device 200, such as an AF, may perform operations or steps of process 500. According to an exemplary implementation, processor 410 executes software 420 to perform a step (in whole or in part) of process 500, as described herein. Alternatively, a step (in whole or in part) may be performed by execution of only hardware. For purposes of description only, at least some of the operations of process 500 are described as being performed by the AF, such as network device 200, without reference to a component of network device 200. Process 500 may include an operation illustrated and described in relation to FIG. 3, and elsewhere in the description.

In block 510, network device 200 may receive a request for user application access control with an individual end device 130 and/or any number of end devices 130 (e.g., enterprise subscriber), as described herein. For example, in response to network device performing a procedure to expose an API to application server 302, application server 302 may generate and transmit a request to network device 200, which includes an end device identifier and an application identifier of the application associated with application server 302, as described herein.

In block 520, network device 200 may generate a user application access control policy based on the request, as described herein. For example, network device 200 may generate policies based on an access control requirement obtained from application server 302. Network device 200 may evaluate the access control requirement, identify underlying criteria of or indicative of the access control requirement in relation to networks devices of a network, areas of interest information, time parameters, network usage information, and the like, and define the policy based on such evaluation, as well as an access control action to be performed when an event of the policy occurs, as described herein.

In block 530, network device 200 may obtain current location information for end device 130, as described herein. For example, network device 200 may identify a network device (e.g., core device 122, etc.) to communicate with to obtain information indicative of the current location, as described herein. In one embodiment, NEF 304 provides the current location information to network device 200.

In block 540, network device 200 may perform a subscription for location monitoring and notification with the network device, as described herein. For example, network device 200 may register with NEF 304, which may enable the location monitoring and notification services during a PDN session, a PDU session, an application session, or the like, of end device 130, as described herein.

In block 550, network device 200 may receive permission information pertaining to the policy, as described herein. For example, network device 200 may receive credit information from a quota validator, as described herein.

In block 560, network device 200 may generate a policy decision from the access control policies, as described herein. For example, network device 200 may determine whether, the current time and at the current time, and/or a type of the relevant user application, determine an access control action associated with the policy based on network usage credit information, as described herein. According to this exemplary scenario, network device 200 may determine to forward or transmit a notification to the application device regarding the policy and end device 130.

In block 570, an application device (e.g., application server 302 or the like) may apply the policy to a network operation or procedure, as described herein. For example, the application device may implement, based on the policy decision, at least one of the time-based rules, location-based rules, and application type-based rules for a network session of the end device. The application device may initiate an application session with end device 130, modify an existing application session with end device, terminate an application session with end device 130, provide a recommendation to end device 130 during the application session, and so forth, as described herein.

FIG. 5 illustrates an exemplary process 500 of the dynamic user application control service, however, according to other exemplary embodiments, the dynamic user application control service may perform additional operations, fewer operations, and/or different operations than those illustrated and described in relation to FIG. 5.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "optout" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device and from an application device, a request for access controls associated with a user application and an end device;
generating, by the network device based on the request, policies pertaining to the access controls, wherein the policies include at least one of time-based rules, location-based rules, or application type-based rules;
obtaining, by the network device, a current location of the end device;
comparing, by the network device, at least one of a current time with the time-based rules, the current location with the location-based rules, or an application type for the user application with the application type-based rules;
generating, by the network device and based on the comparing, a policy decision among the policies pertaining to the access controls; and
applying, by the network device and based on the policy decision, at least one of the time-based rules, the location-based rules, or the application type-based rules for establishment of an application session with the end device.

2. The method of claim 1, further comprising:
performing a subscription procedure that creates a subscription for monitoring and notification of the current location of the end device.

3. The method of claim 2, further comprising:
receiving, per the subscription, an update to the current location; and
determining whether the updated current location corresponds to a different policy decision.

4. The method of claim 1,
further comprising:
exposing, via an application programming interface (API), an access control to the end device, wherein the receiving of the request is performed in response to the API.

5. The method of claim 1, further comprising:
obtaining permission information from a quota validator, wherein the generating of the policy decision is further based on the permission information.

6. The method of claim 1, further comprising:
updating the current time; and
determining whether the updated current time corresponds to a different policy decision.

7. The method of claim 1, wherein the network device comprises an application function in a core network.

8. A system comprising:
a network device comprising:
a communication interface; and
a processor configured to:

receive, from an application device, a request for access controls associated with a user application and an end device;
generate, based on the request, policies pertaining to the access controls, wherein the policies include at least one of time-based rules, location-based rules, or application type-based rules;
obtain a current location of the end device;
compare at least one of a current time with the time-based rules, the current location with the location-based rules, or an application type for the user application with the application type-based rules;
generate, based on the comparing, a policy decision among the policies pertaining to the access controls; and
apply, based on the policy decision, at least one of the time-based rules, the location-based rules, or the application type-based rules for establishment of an application session with the end device.

9. The system of claim 8, wherein the processor is further configured to:
perform a subscription procedure that creates a subscription for monitoring and notification of the current location of the end device.

10. The system of claim 9, wherein the processor is further configured to:
receive, per the subscription, an update to the current location; and
determine whether the updated current location corresponds to a different policy decision.

11. The system of claim 8, wherein the processor is further configured to:
expose, via an application programming interface (API), an access control to the end device, wherein the receiving of the request is performed in response to the API.

12. The system of claim 8, wherein the processor is further configured to:
obtain permission information from a quota validator, wherein the generating of the policy decision is further based on the permission information.

13. The system of claim 8, wherein the processor is further configured to:
update the current time; and
determine whether the updated current time corresponds to a different policy decision.

14. The system of claim 8, wherein the network device comprises an application function in a core network.

15. A non-transitory computer-readable storage medium storing instructions executable by a processor of a network device, wherein the instructions are configured to:
receive, from an application device, a request for access controls associated with a user application and an end device;
generate, based on the request, policies pertaining to the access controls, wherein the policies include at least one of time-based rules, location-based rules, and application type-based rules;
obtain a current location of the end device;
compare at least one of a current time with the time-based rules, the current location with the location-based rules, or an application type for the user application with the application type-based rules;
generate, based on the comparing, a policy decision among the policies pertaining to the access controls; and apply, based on the policy decision, at least one of the time-based rules, the location-based rules, or the application type-based rules for establishment of an application session with the end device.

16. The non-transitory computer-readable storage medium of claim 15, wherein the instructions to generate the policy decision are further configured to:

perform a subscription procedure that creates a subscription for monitoring and notification of the current location of the end device.

17. The non-transitory computer-readable storage medium of claim 16, wherein the instructions to generate the policy decision are further configured to:

receive, per the subscription, an update to the current location; and determine whether the updated current location corresponds to a different policy decision.

18. The non-transitory computer-readable storage medium of claim 15, wherein the instructions to generate the policy are further configured to:

expose, via an application programming interface (API), an access control to the end device, wherein the receiving of the request is performed in response to the API.

19. The non-transitory computer-readable storage medium of claim 15, wherein the instructions to generate the policy decision are further configured to:

obtain permission information from a quota validator, wherein the generating of the policy decision is further based on the permission information.

20. The non-transitory computer-readable storage medium of claim 15, wherein the instructions are further configured to:

update the current time; and determine whether the updated current time corresponds to a different policy decision.

\* \* \* \* \*